C. W. MICHAEL.
DISK HARROW.
APPLICATION FILED DEC. 31, 1909.
1,026,760.
Patented May 21, 1912.
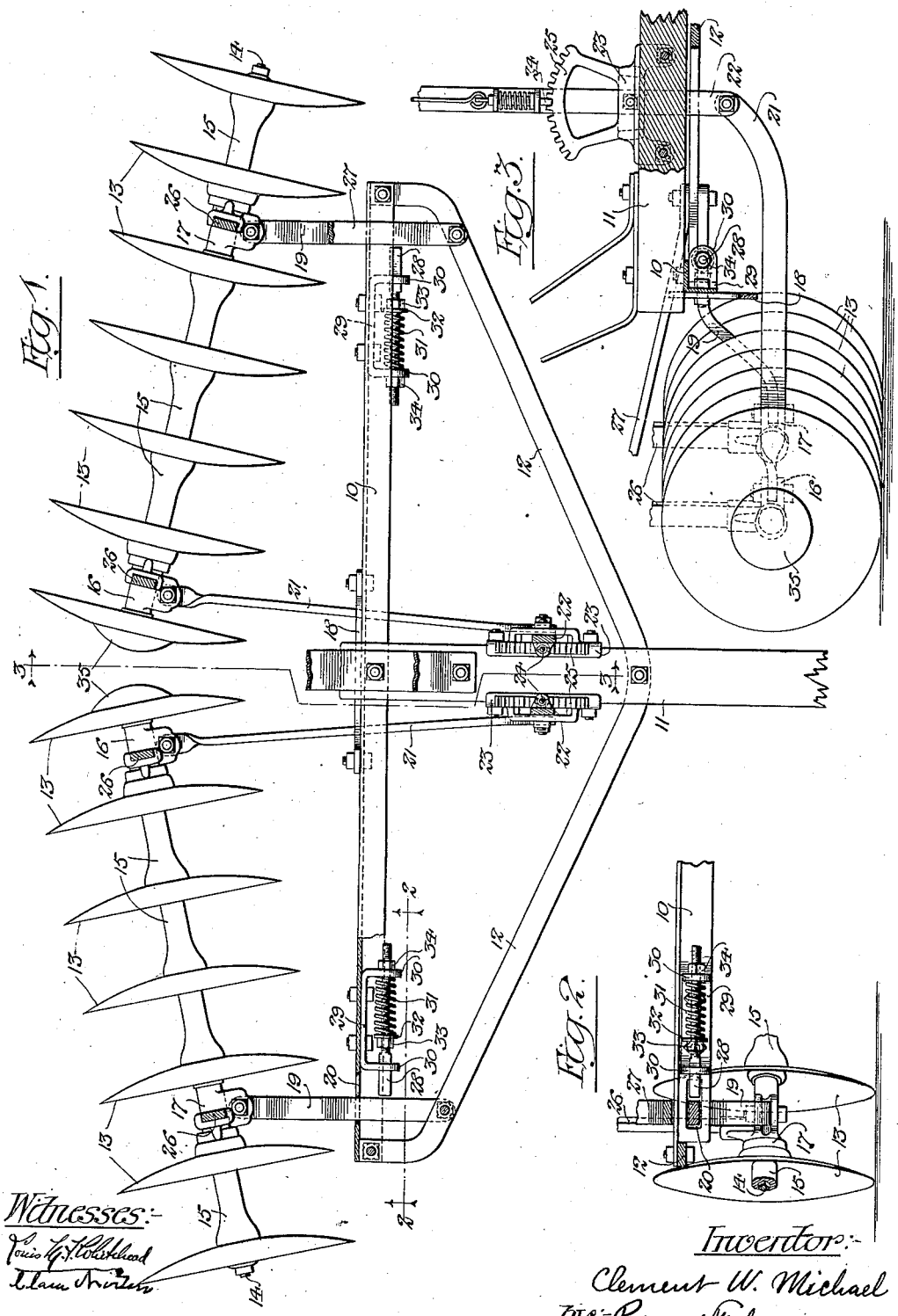

UNITED STATES PATENT OFFICE.

CLEMENT W. MICHAEL, OF RACINE, WISCONSIN, ASSIGNOR TO J. I. CASE PLOW WORKS, OF RACINE, WISCONSIN, A CORPORATION.

DISK HARROW.

1,026,760.  Specification of Letters Patent.  Patented May 21, 1912.

Application filed December 31, 1909. Serial No. 535,751.

*To all whom it may concern:*

Be it known that I, CLEMENT W. MICHAEL, a citizen of the United States, and a resident of Racine, county of Racine, and State of Wisconsin, have invented certain new and useful Improvements in Disk Harrows, of which the following is a specification.

The invention relates to disk harrows which are usually provided with two gangs of revolving disks. In operation, the disk gangs are inclined to the line of draft, the inner adjacent ends of the gangs being rearward of their forward outer ends. The gangs have a limited lateral play transverse to the line of draft, and the concave faces of the disks face outwardly, so that the side thrust of the soil upon the gangs brings their inner ends into engagement. To reduce the friction between the inner, abutting ends of the two rotatable disk gangs, the inner ends are usually provided with semispherical bumpers.

The present invention seeks to further reduce the friction between the gangs and thereby reduce the wear and tear thereon by providing spring means for resisting the side thrust of the gangs and consists in the features of improvement hereinafter set forth, illustrated in the accompanying drawings and more particularly pointed out in the appended claims.

In the preferred form of the invention, the side thrust of the gangs is resisted and the gangs are held apart by a pair of yielding stop-devices or plungers mounted on the frame and arranged to engage the outer draw-bars that are pivoted at their ends to the frame and to the disk gangs. Preferably also, means are provided for adjusting the position of the spring plungers and for regulating the tension of their springs.

The preferred form of the invention is illustrated in the accompanying drawing in which—

Figure 1 is a plan view with a portion of the frame broken away and shown in section to clearly illustrate the construction of one of the spring plungers. Fig. 2 is a detail view in elevation with parts shown in section on the line 2—2 of Fig. 1. Fig. 3 is a detail view in elevation with parts shown in section on the line 3—3 of Fig. 1.

The frame of the disk harrow illustrated comprises a rear transverse angle bar 10 that is centrally fixed to the rear end of a tongue 11. A front frame-bar 12 is centrally fixed to the tongue and comprises side portions rearwardly inclined therefrom and connected at their ends to the ends of the rear bar 10. The gangs comprise sets of concavo-convex disks 13, the disks of each gang being mounted upon a shaft 14 and held in position thereon by spacing sleeves or spools 15. The shafts 14 of the gangs are journaled adjacent their inner and outer ends in boxes 16 and 17. Outer draw-bars 19 are pivotally connected at their rear ends to the outer journal boxes 17 of the gangs and extend upwardly and forwardly therefrom through slots 20 in the vertical flange of the angle-bar 10 and are pivotally connected at their forward ends to the front frame-bar 12. Links 21 are pivotally connected at their rear ends to the inner journal boxes 16 of the gang and extend forwardly therefrom and are pivotally connected at their forward ends to the lower ends of a pair of adjusting levers 22. These adjusting levers are pivoted adjacent their lower ends upon brackets 23 secured to the tongue 11 and each lever is provided with the usual spring-held locking dog 24 which is arranged to engage a notched segment 25 formed upon the corresponding bracket 23. By shifting the lever 23, the inner, adjacent ends of the disk gangs are moved back and forth and the angle or inclination of the gangs to the line of draft is thereby adjusted. The vertical movement of the inner ends of the gangs is limited by a transverse stop-bar 18 which extends above the inner draw-bars 21 and the ends of which are upturned and secured to the rear frame-bar 10. The lateral movement of the gangs is limited by the engagement of the outer draw-bars 19 with the ends of slots 20 in the rear frame-bar 10. The journal boxes 16 and 17 of the gangs are provided with the usual upright standards 26 that carry the scraper-bars and weight-boxes (not shown), the latter being connected to the frame by the links or bars 27 which are arranged in line with and above the draw-bars 19.

In operation, the disk gangs are arranged in inclined position, as shown in Fig. 1, with the inner adjacent ends thereof rearward of their outer ends. The concave sides of the disk face outwardly, so that the side thrust of the soil upon the gangs tends to bring the inner ends thereof into engagement. In accordance with the present invention, this side thrust of the gangs is yieldingly resisted, preferably by a pair of stop-devices or spring plungers 28 that are arranged to engage the outer draw-bars 19. These plungers are held in position by a pair of U-shaped clips or holders 29 which are secured in horizontal position to the vertical flange of the angle-bar 10 and are provided at their ends with forwardly extending, perforated ears 30 through which the plungers are arranged to slide longitudinally and in horizontal direction. The supporting clips and plungers are arranged inside the outer draw-bars 19 with the plungers in position to be engaged thereby. The inward shift of the plungers and draw-bars is resisted by springs 31. Each of these springs is coiled about the corresponding plunger and extends between the innermost ear 30 and a washer 32 on the plunger that is held in place by an adjusting nut 33. The outward movement of each plunger is limited by an adjusting nut 34 threaded on its inner end and engaging the innermost ear 30 of the corresponding clip or holder 29. By adjusting the nut 34, the position of the plungers 28, with reference to the draw-bars 19, can be adjusted as desired, and by means of the nut 33, the tension of the springs 31 can be regulated.

In operation, the spring-held plungers engage the outer draw-bars 19 and yieldingly resist the side thrust or lateral movement of the gangs. The plungers, however, will yield to permit the slight lateral movement of the gangs when they meet with an obstruction of any sort. The gangs are thus yieldingly held apart, so that the friction between the inner ends thereof and the wear and tear on the gangs are considerably reduced. As the inner ends of the gangs are, however, occasionally brought into engagement, they are provided with the semispherical bumpers 35, as shown. The springs 31 are quite heavy so that they will effectively perform their function of resisting the side thrust of the gangs and will, therefore, greatly reduce the friction even when the bumpers 35 on the inner ends of the gangs are in contact.

It is obvious that the details set forth may be varied without departure from the essentials of the invention.

I claim as my invention:—

1. In a disk harrow, the combination with a frame, two disk-gangs and draw-bars pivotally connecting said gangs and said frame, of spring-held plungers arranged to engage said draw-bars to resist the side thrust of said gangs and yieldingly hold the same apart, and supporting guides fixed to the frame wherein said plungers are slidably mounted, substantially as described.

2. In a disk harrow, the combination with the frame comprising front and rear bars, of a pair of disk gangs, inner and outer draw bars pivotally connected to said gangs, said outer draw bars being pivotally connected to said front frame bar, adjusting levers on the frame connected to said inner draw bars and spring-held plungers mounted on said rear bar and engaging said outer draw bars to yieldingly hold said gangs apart, substantially as described.

3. In a disk harrow, the combination with the frame comprising front and rear bars, of a pair of disk-gangs, draw-bars pivoted to said gangs and to said front frame bars, and spring-held plungers engaging said draw-bar to yieldingly resist the inward movement of said disk-gangs and for holding the same apart, and supporting guides fixed to said rear frame bar wherein said plungers are slidably mounted, substantially as described.

4. In a disk harrow, the combination with the frame comprising front and rear bars, of a pair of disk gangs, draw bars pivoted to said gangs and to said front frame bars, and spring-held stop plungers in one way engagement with said draw bars to yieldingly resist the inward movement of said gangs, said rear bar having guides wherein said stop plungers are slidably mounted, and means for adjusting the normal position of said stop plungers.

5. In a disk harrow, the combination with the frame comprising front and rear bars, of two disk-gangs, inner and outer draw-bars pivotally connected to said gangs, adjusting levers on the frame connected to said inner draw-bars, said outer draw-bars extending through slots in said rear frame bar and being pivotally connected to said front frame bar, and sliding, spring-held plungers mounted on said rear frame bar and engaging said outer draw-bars to yieldingly hold said gangs apart, substantially as described.

6. In a disk harrow, the combination with the frame comprising front and rear bars, of two disk-gangs, inner and outer draw-bars pivotally connected to said gangs, adjusting levers on the frame connected to said inner draw-bars, said outer draw-bars extending through slots in said rear frame bar and being pivotally connected to said front frame-bar, U-shaped holders mounted on said rear frame bars, sliding plungers mounted on said holders and arranged to engage said outer draw-bars, springs coiled about said plungers, and nuts on said plungers for adjusting the position thereof and the tension of said springs, substantially as described.

7. In a disk harrow, the combination with the frame, disk-gangs and laterally swinging draw bars connecting said gangs to said frame, of stop plungers mounted on the frame and arranged to engage said draw bars to resist the inward movement of said disk-gangs, springs for resisting the movement of said stop plungers, means for adjusting the tension of said springs and separate means for adjusting the normal position of said stop plungers.

CLEMENT W. MICHAEL.

Witnesses:
STANLEY A. BREWER,
ROY W. MARTIN.

Copies of this patent may be obtained for five cents each, by addressing the "Commissioner of Patents, Washington, D. C."